United States Patent [19]

Milner et al.

[11] Patent Number: 4,498,909
[45] Date of Patent: Feb. 12, 1985

[54] PROCESS FOR THE GASIFICATION OF FUELS

[75] Inventors: Geoffrey Milner, Stockton-on-Tees, England; Michael F. Butler, Lakeland; Robert A. Ashworth, St. Petersburg, both of Fla.

[73] Assignee: DM International, Inc., Houston, Tex.

[21] Appl. No.: 438,652

[22] Filed: Nov. 2, 1982

[51] Int. Cl.³ ............................ C10J 3/02; C10J 3/16; C10J 3/42

[52] U.S. Cl. ........................................ 48/209; 48/66; 48/68; 48/111; 48/206; 110/229; 110/248; 252/373

[58] Field of Search ............... 48/111, 209, 66, 68, 48/203, 197 R, 206; 110/229, 230, 231, 315, 247, 248; 252/373

[56] References Cited

U.S. PATENT DOCUMENTS

| | | | |
|---|---|---|---|
| 1,030,333 | 6/1912 | Rusby et al. | 48/203 |
| 3,787,192 | 1/1974 | Ban | 48/203 |
| 3,985,518 | 10/1976 | Anderson | 48/111 |
| 4,014,664 | 3/1977 | Kupfer et al. | 48/68 |
| 4,268,274 | 5/1981 | Caughey | 48/111 |
| 4,388,082 | 6/1983 | Guttman | 48/111 |
| 4,401,440 | 8/1983 | Alink | 48/68 |

OTHER PUBLICATIONS

T. B. Reed (editor), *Biomass Gasification Principles and Technology*, Noyes Data Corporation, Park Ridge, N.J., 1981, p. 229.

H. H. Lowry (editor), *Chemistry of Coal Utilization*, John Wiley & Sons, Inc., New York, 1963, pp. 949-951.

Symposium Papers, *Advances in Coal Utilization Technology*, Institute of Gas Technology, May 1979, p. 18.

*Primary Examiner*—S. Leon Bashore
*Assistant Examiner*—K. M. Hastings
*Attorney, Agent, or Firm*—Bernard, Rothwell & Brown

[57] ABSTRACT

A process for continuously gasifying wood, wood chips, wood charcoal, or other low-ash biomass material in a mechanically-ashed gasifier using a fixed bed gasification system to obtain a gaseous product relatively rich in carbon monoxide and hydrogen. Product gas comprising carbon monoxide, hydrogen, and carbon dioxide, together with methane and other diluents, is withdrawn from the gasification chamber. Sufficient noncombustible, particulate, refractory material is fed to the gasifier to provide an adequately deep layer of noncombustible solids on a moveable grate which supports the fuel bed, the object being to prevent damage to the grate and the grate-actuating mechanism caused by overheating, when the ash bed becomes too thin. The product gases from the gasification chamber may be used as raw synthesis gas for the production of, for example, methanol or as furnace heating gases.

14 Claims, 2 Drawing Figures

PROCESS FOR THE GASIFICATION OF FUELS

This invention relates to the gasification of low-ash biomass materials to obtain product gases relatively rich in carbon monoxide and hydrogen.

Formerly when gasifying wood, wood chips, wood charcoal, or other biomass fuel for the production of gas rich in combustibles, static grates have been employed for supporting the fuel bed and distributing the air used for gasification, usually without the addition of steam to the air. The ash content of the wood fuel is generally low, e.g., less than about 3%, and care must be exercised to permit ash to accumulate on the grate so as to protect it from damage by burning. The latter may occur when incandescent carbon derived from the wood is allowed to rest directly on the grate. To avoid undue accumulation of ash on the grate, the ash layer is thinned at regular intervals of time by means of pokers operated by hand through a multiplicity of holes in the brick lining and steel shell of the producer. The holes may be arranged around the circumference of the producer and on two or more levels so that all parts of the grate and the layer of ash thereon may be reached. By careful poking, the ash may be caused to pass from the grate to a water-sealed ash bowl from which it may be removed by hand shovelling. The operation involves manual labor and demands experience and skill on the part of the operator to ensure the maintenance of the proper amount of ash on the grate.

Vessels that have been used successfully for gasifying wood blocks or logs of various sizes have been cylindrical or designed to be somewhat wider at the grate level than at the surface of the fuel bed. The latter design ensures that the mass of fuel can settle steadily as combustion takes place without the need to poke the fire from above. Such poking is impractical when gasifying large pieces of wood. On the other hand, the tapered design, wider near the base, is essential when gasifying light "fluffy" fuels, such as wood shavings, cotton seed husks, and similar materials of low bulk density. Fires tend to burn "hollow", and poking from above must be performed at regular intervals of time to settle the mass of fuel.

It is believed that one of the largest vessels that has been heretofore successfully employed as a static grate producer for gasifying wood was twelve feet in diameter at the grate level, and the maximum throughput on a "theoretically dry" wood basis was about 48 tons per day, which is equivalent to 68 tons per day of wood containing about 30% moisture. This size limitation on the gasifier makes it economically unattractive in many commercial situations.

The present invention avoids the foregoing difficulties and limitations in the gasification of wood, wood chips, petroleum coke, wood charcoal or other low-ash biomass fuels to produce gases that are relatively rich in carbon monoxide and hydrogen, and usable in various chemical syntheses or as fuel. These objects are achieved by gasifying wood, wood chips (e.g., $1\frac{1}{2}''\times 1\frac{1}{2}''\times \frac{1}{4}''$ or less), wood charcoal, or other biomass fuel as a fixed or compact bed in a suitable gasification vessel equipped with a moving grate, at the same time providing with the fuel charged to the vessel, solid, noncombustible, nonfusing, refractory material in particulate form which is relatively inert to the gasification environment. By maintaining a sufficient amount of such solids on the grate, it and the associated equipment for supporting and actuating the grate may be protected from undue damage which could be caused by local high temperatures resulting from the combustion of the fuel too near to the grate.

Typically, woods and other biomass fuels are of relatively low-ash content compared with other solid fuels, such as coal and coke, which have heretofore been gasified in vessels equipped with rotating grates. In the latter operations, the grate moves at speeds sufficient to agitate the fuel bed adequately to ensure the downward movement of the fuel as gasification proceeds. Movement of the grate serves to remove ash from the grate. By controlling the rate of removal to just balance the rate of production of ash by gasification of the fuel, a layer of ash of substantially constant thickness remains on the grate to protect it and the grate-actuating mechanism from the effects which could result from exposure to the high temperature (e.g., about 1100°–1200° C.) which exists in the combustion zone, especially when free oxygen is present.

In contrast, the ash content of woods and other low-ash biomass fuels is generally below about 3 weight %, or even below about 1 to 1.5%. The amount of ash resulting from gasification of wood, wood chips, wood charcoal, and other biomass fuels is so small that the use of a moving grate at speeds adequate for fuel bed agitation would denude the grate of ash to such an extent that there results an insufficient amount retained on the grate to protect it from damage by overheating. By the present invention, woods, wood chips, wood charcoal, or other biomass fuels can be gasified in a vessel equipped with a moving grate that is operated at speeds suitable to maintain movement of the fuel bed by gravity and mechanically ash the bed. Undue damage to the grate is avoided by charging to the gasifier, together with the fuel, refractory material at an appropriate rate so that the amount supplied, together with the ash that results from the combustion of fuel, and taking into account the amount of solids passing from the grate at its operating speed, serves to maintain a sufficient thickness of relatively incombustible material on the grate to protect adequately the grate and its driving mechanism and other parts from undue damage from heat and oxygen-containing gases. Moreover, excessive wear of the grate mechanisms and attendant maintenance costs can be avoided by operating in accordance with this invention.

The refractory material, e.g. artificial ash, added in conjunction with the low-ash biomass feed is one material advantageously distinguishable from the ash of the bio-mass, e.g. in the form of sized particles, to allow easy separation from the ash of the bio-mass and recycled to the gasifier.

Figure 1:
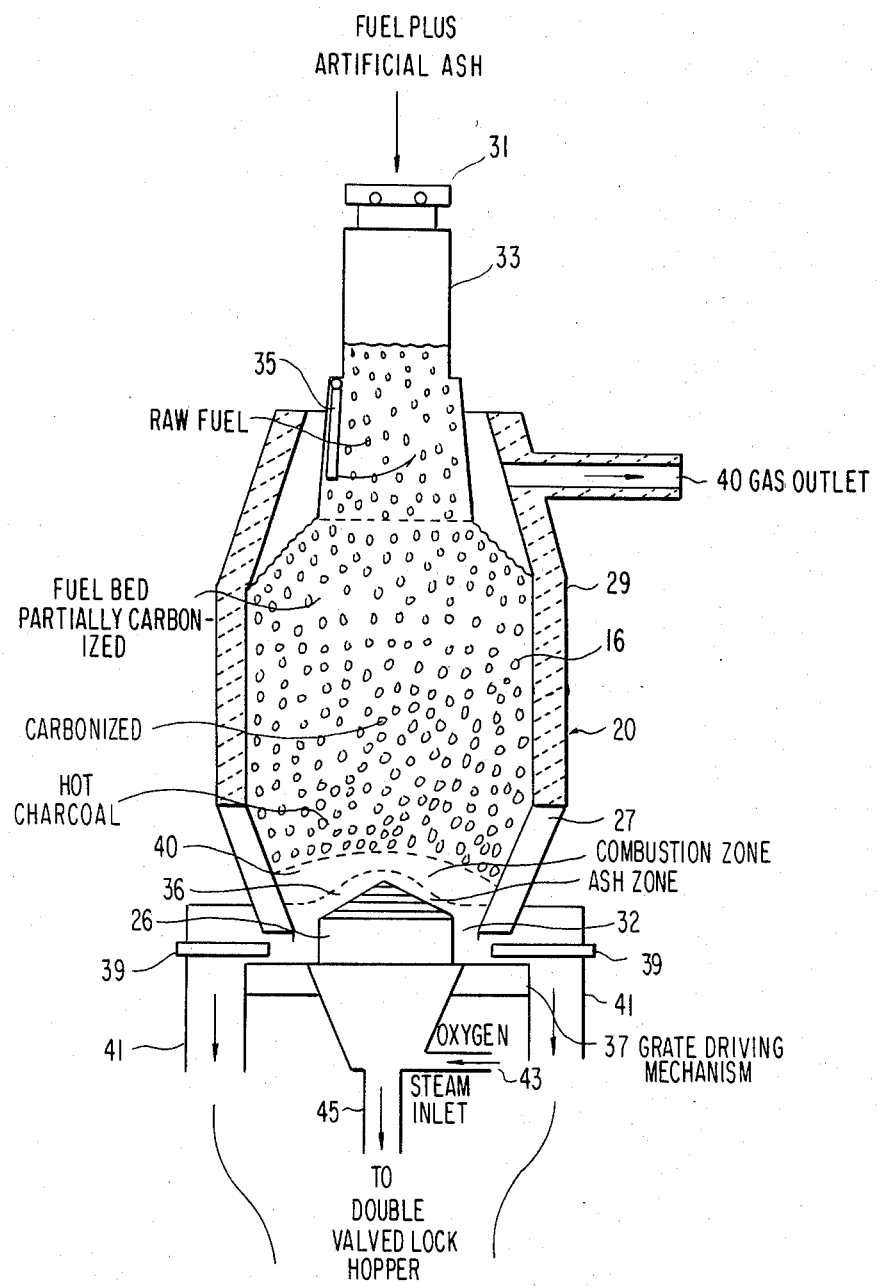
FIG. 1 is a diagrammatic view of an apparatus for use in the present invention.

A typical apparatus for use in the present invention is diagrammatically shown in FIG. 1. The gasifier 20 is fitted with a rotary mechanical grate 26; low pressure boiler jacket 27 at the combustion zone level; refractory brick-liner 29 at the higher levels; the boiler jacket is tapered, being wider at the top; and the central part of the gasifier is cylindrical. The upper part of the gasifier tapers inwards towards the top. The fuel and refractory "artificial ash" are fed through an opened deadweight rolling valve 31 into a hopper 33 closed at its lower end by a "flap" valve 35 which is closed when valve 31 is open. From the hopper, the fuel is discharged by opening the "flap" valve into the inner bell (after closing the deadweight valve) of hopper 33 from which it falls by gravity into the body of the gasifier in which the fuel is gradually consumed by the gasification process. The lower portion of the gasification chamber housing the moving grate and accommodating the combustion zone can have a narrower lower end than the upper end of this portion and, therefore, be in the form of a truncated, inverted cone. The walls of this area can thus be divergent at say up to an angle of about 40° from the axis of chamber 20, and, the angle may be at least about 10° or 20°, depending upon the type of material being gasified. This shape of gasifier has been developed specifically for the gasification of blocks of wood, at much higher fixed carbon gasification rates at grate level than was the former practice for the gasification of wood in gas producers, when using air only, i.e., without the addition of steam to the air used for gasification.

The invention may also be used in gasification chambers of other shapes. For instance, a more or less totally cylindrical chamber may be employed. If, for example, a low-ash, low-volatile material such as petroleum coke should be required to be gasified at high rates by means of oxygen and steam, then there would be no need for a long period of residence in the upper part of the fuel bed. Consequently, for such duty a cylindrical vessel could be used, and its height arranged to provide for a much shallower fuel bed than that needed for the gasification of wood.

The gasification operation in chamber 20 generally involves several sequential effects as the fuel moves downwardly in the bed. In the upper part of the bed, the fuel is partially carbonized, and the fuel becomes further carbonized in the middle portion of the bed. As the fuel descends lower in the bed, it is transformed into charcoal, and the hot charcoal is capable of reacting with superheated steam, yielding carbon monoxide and hydrogen. The lowermost gasification zone in the bed serves to accomplish combustion which provides the heat necessary to support the reduction reactions which give rise to the principal gaseous products, namely, carbon monoxide and hydrogen. The combustion zone 40 is immediately above the ash zone 36 supported on the moving grate.

Wood and other low-ash biomass fuels which may be gasified in accordance with this invention may have an ash content of up to about 2 or 3 weight % or so, often about 0.5 to 1% ash. Typically, the wood may contain up to about 50 weight % moisture, for instance, about 25 to 40%. The fixed carbon content of the oven-dried wood may be, for example, from 15 to 25 weight %, preferably as high as may be available. Exemplary of typical woods that may be used in the present invention are oak, pine, maple, fir, and eucalyptus.

In the past, gasifiers have been designed to gasify logs of wood up to 6 feet or more in length and up to 2 feet in diameter. Other gasifiers have been designed for logs up to 8 inches in diameter by 2 feet in length. Yet, other gasifiers have been designed for gasifying waste such as sawdust, bagasse, shavings, and cotton seed husks, while others have been used for gasifying small wood blocks. So far as is known, all have had static grates and have been hand-charged and hand-ashed and all have gasified wood and other biomass fuels at a very low rate of carbon consumption per unit of cross-sectional area of the producer grate. Such rates of gasification correspond to 8 pounds of fixed carbon per hour per square foot of cross-section of the bed taken at the grate level. In modern practice, higher rates of gasification of at least about 15, preferably about 25 to 40, pounds of fixed carbon per hour per square foot of cross-section of the bed taken at the grate level, are required to obtain desired advantageous throughputs. The present invention is capable of accomplishing these high gasification rates.

In the present invention, the gasification chamber 20 is equipped for mechanical ashing, and is shown as having a rotating grate 26 that supports the downwardly moving bed of fuel 16. The diameter of the gasifier at grate support level may be, for example, 13 feet and the maximum diameter of the bed may be about 20 to 24 feet. The wood pieces disposed in the bed are in sizes that generally decrease from the top to the bottom of the bed due to the effects of the gasification operation, that is, the wood is consumed as it moves downwardly in the bed. This movement is facilitated by the movement of grate 26. Mechanisms for rotating grates of this type are well-known and are only illustrated diagrammatically in FIG. 1 of the drawing as indicated at 37. The suitably supported grate is actuated by mechanisms (not shown) below grate level. Grate 26 may be mounted eccentrically within the chamber 20. Grate 26 has openings to permit gas to flow into and upwardly through the bed while preventing most, if not all, of the ash from entering the openings.

Figure 2:
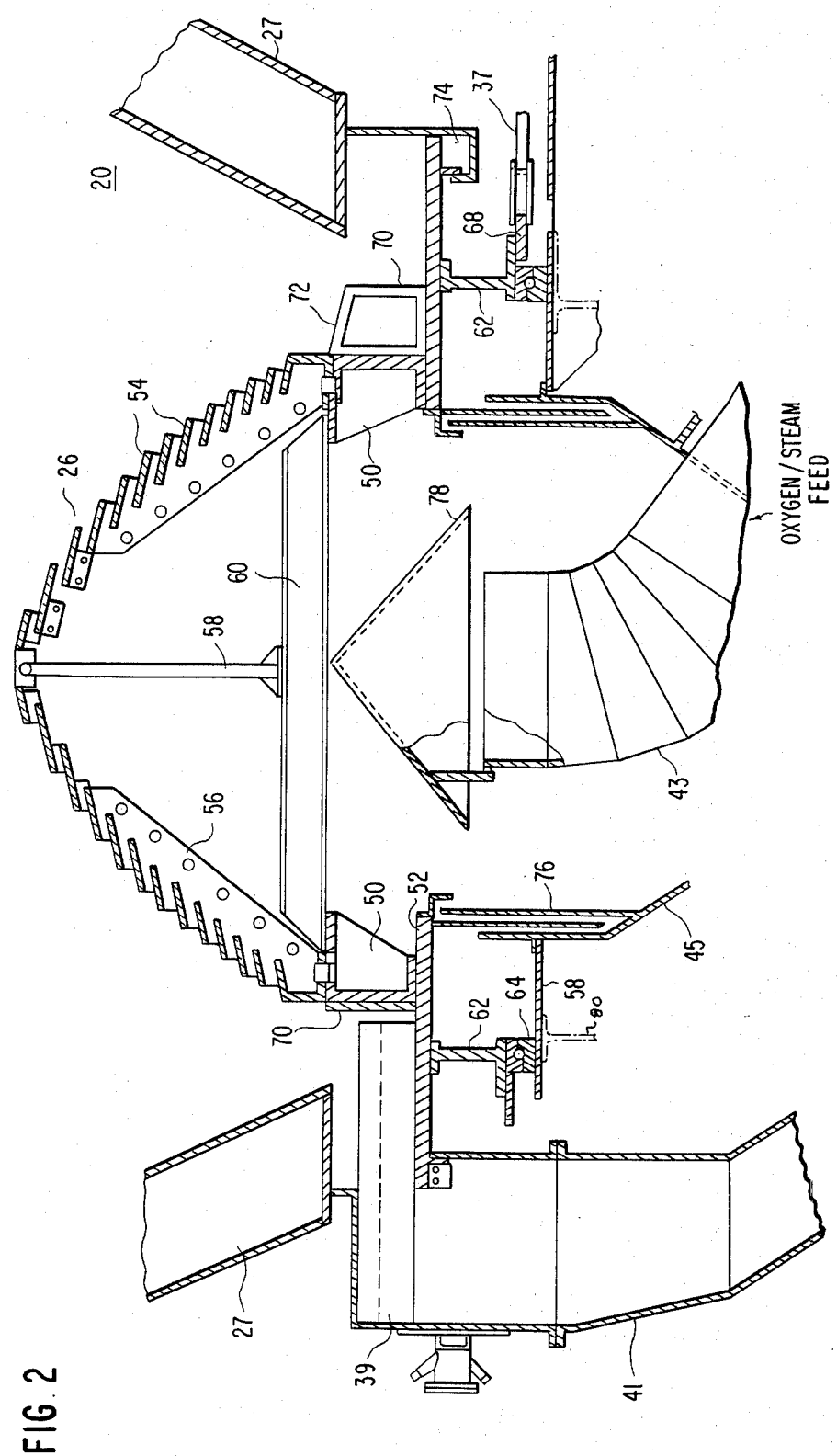
FIG. 2 is an embodiment of a grate-system for use in the present invention.

An embodiment of a suitable grate-system is shown in FIG. 2. The grate 26 has base members 50 mounted on an annular table 52 positioned beneath the bottom opening of the lower section 27 of the chamber wall. The grate 26 includes an upper cone-shaped array of annular lower plates 54 mounted on inner upwardly converging supports 56 which are reinforced by rod 58 and are mounted on the base members 50. The upper apex of the cone-shaped array is further supported by a rod 58 extending upwardly from a beam 60 extending across the base 50. The peripheries of the lower plates 54 extend downwardly relative to their interior edges to form upwardly and inwardly extending slanted grate openings into the interior of the cone-shaped grate. The table 52 is mounted on a circular support 62 which is rotatably mounted by a circular bearing 64 on an external support 80 of the gasifier. A driving ring 68 is also mounted on the support 62 being driven by the grate driving mechanism 37 to rotate the table 52.

The grate 26 is positioned eccentrically relative to the axis of rotation of the table 52 and the bottom of the chamber 20. A ring member 70 has an eccentric center opening receiving and enclosing the base 50 of the grate and has its periphery concentric with the bottom openings in the lower wall section 27 of the chamber 20 to define an annular opening between the grate 26 and bottom wall section 27. The inwardly tapered wall section 27 and cone-shaped grate 26 are designed to cooperate in cambering the contents during agitation. The crescent shaped upper surface 72 of member 70 is beveled downwardly for aiding in cambering movement of the contents of the chamber 20 during eccentric rotation of the grate 26.

An outer seal (not shown) utilizing support 74 seals the outer periphery of the table 52 with the bottom of the wall section 27. An inner seal 76 seals the inner periphery of the table 52 with central ash chute 45 which receives the ash passing through the grate 26. Within the chute 45, a hood 78 extends over the opening of the inlet 43 to prevent ash from falling in the inlet and to distribute gas.

As stated above, the rotation of the eccentrically-mounted grate 26 agitates the fire bed to facilitate the free flow of the fuel charge undergoing gasification in chamber 20. Movement of the grate provides sufficient agitation of the bed to ensure that the fuel continues to settle as it is gasified, and the resulting ash moves downwardly along the upper, outer surface of the grate 26 and past the lower edge of the grate towards the periphery of the gasifier. Here the ash rests on the grate table which also rotates as shown in FIG. 2. The ash is removed from the bottom of the producer as shown in FIG. 1 by two ash plows 39, placed diametrically opposite each other, which cause the ash to spill from the edge of the table into two chutes 41. These chutes direct the ash into two double-valved lock hoppers (not shown) from which ash is discharged intermittently. An oxygen-containing gas and steam are charged to the gasifier at 43, and ash is withdrawn through conduit 45 leading to a double valved lock hopper. The chamber can be sealed according to known techniques and has preferably a dry-sealed base as indicated, although a wet-sealed system could be employed. A grate system fitted to a gasifier 13 feet in diameter at the grate support level can be designed to discharge up to about 22 tons of ash per day, preferably about 8 to 16 tons per day. A suitable discharge rate for a given ash plow is about 4 to 8 tons per day.

Movement of the grate 26 tends to denude it of ash which would otherwise serve to protect the grate and its actuating mechanisms from the high temperatures generated in the combustion zone. Wood and other biomass fuels generally have such a low ash content that rotation of the grate suitable for adequate bed movement leads to an insufficient accumulation of ash on the top surface of the grate to provide adequate protection for the grate or its driving mechanisms. The present invention provides a substantial layer of refractory particles 36 on the upper surface of grate 26 during the gasification operation. The layer of incombustible material is sufficient in depth to protect the grate, and thus the amount of refractory material charged with the fuel feed to gasification chamber 20 is sufficient to maintain the said layer 36 even at grate rotating speeds that are sufficient to provide adequate agitation of the fuel bed.

The rotation of the grate may be conducted in a continuous or intermittent fashion, and such speeds can be of the same order as employed in known coal and coke gasification techniques. For example, the outer periphery or edge of the grate adjacent the interior of the exterior wall of chamber 20 may move at a speed of at least 2.5 inches per minute on an average taken over a period of, say, one hour. Typically, these speeds need not be above about 2 feet per minute, for example, about 0.1 to 2, preferably about 0.2 to 1, feet per minute.

The refractory layer 36 should have a thickness sufficient to protect the grate from deleterious heat from the combustion zone and is generally several inches, for example, about 6 to 12 inches measured vertically from the upper surface of the grate 26 and is preferably as near to 9 inches as may be maintained. With ordinary woods, ash beds of this depth cannot be maintained when grate 26 operates at speeds of the order of those mentioned above. In this respect, one may consider that wood having an ash content of about 0.8 weight % of the wet wood containing 30 weight % of moisture will produce only about 2.4 tons of ash per day when about 240 tons per day of "theoretically" dry wood is charged to chamber 20. Therefore, in accordance with the present invention, sufficient particulate refractory material is added to the gasifier, together with the fuel as indicated above, in order to provide for adequate accumulation of ash and refractory material for protection of the grate 26. The refractory material should be sized to less than about 5 inches in diameter. It should be closely graded for best results, for example by means of square mesh sieves possessing apertures of 4", $2\frac{1}{2}$", $1\frac{5}{8}$", and 1" sides. The refractory may be separated into approximate 1" to $1\frac{5}{8}$", $1\frac{5}{8}$" to $2\frac{1}{2}$", and $2\frac{1}{2}$" to 4" fractions. The fractions may be kept separate, and only one size used in each individual gasifier. When it is necessary to change the size of the refractory "artificial ash," the performance of the gasifier in regard to ash discharge should be carefully observed until the change in particle size in the ash resting on the grate has been completed.

Practical experience with large-scale water gas generators, with grate diameters ranging from about 10 feet to 13 feet, have shown that rates of ash discharge within the range of about 8 and 16 tons per day usually give good control of firebed conditions, and these are the preferred rates of addition to and removal from the gasifier of well-graded refractory material. In the instance noted above where the wood feed has an ash content of about 0.8 weight % of the wet wood containing 30 weight % of moisture, sufficient ash layer 32 on grate 26 may be provided by adding about 10 tons per day of refractory. At steady state operation, once the desired refractory layer is established, the amount of ash and refractory material discharged from the grate may approximate that fed to the gasification chamber.

The refractory material charged with the wood to the gasification chamber should be closely sized and composed of pieces of solid refractory material having a fusion temperature which is sufficiently high to prevent fusion of the particles to one another during their passage through the gasification chamber. The maximum temperature that is reached in the combustion zone of the gasification chamber 20 should be controlled so as not to exceed 1400° C., and is preferably kept within the limits of about 1100° C. to 1300° C. The minimum fusion temperature of the refractory material should be at least about 200° or 300° C. higher than the maximum gasification temperature, e.g., about 1500° C. or more. Suitable refractory materials are in common use in industry generally, and scrap material would be satisfactory if properly sized. For example, the more common types of firebrick, composed mainly of alumina and silica with alumina contents of about 28% to 45%, should all be suitable as also would be the less common types. The refractory material may be an ash produced by combustion of various carbonaceous materials, for example, the refractory material may be ash from wood, wood chips, coal or coke providing the fusion temperature is sufficiently high and the ash has an appropriate particle size. The alternative types of refractory may be produced in part or entirely by another fuel gasification process or by the gasification operation of the invention. The latter may require that operation of the gasifier be started with refractory material obtained from a previous or other type of operation and the ash produced subsequently recycled to the operation as a part or all of the refractory charge.

During the wood gasification operation of the present invention, oxygen in the form of air or as oxygen-enriched air or as substantially pure oxygen is blended with the correct proportion of steam and charged to beneath grate 26 by way of line 43. Carbon dioxide may also be added to the mixture. Any mixture of oxygen with other reactants, for example, steam, carbon dioxide, or diluent air, must be mixed very thoroughly by any suitable conventional method prior to the mixture entering the space below the grate 26. Other gases such as sulfur dioxide may form part of the total gases fed to the gasification chamber, but the preceding comment regarding mixing still applies. A steam/$O_2$ mixture is fed through the bottom header and distributed throughout the bed of the gasifier by means of an eccentrically-mounted rotating grate, for instance, as shown in FIG. 2 as described above. The grate base is designed so that there is a constant stirring action to the ash bed. Ash is removed by means of an adjustable ash plow 39 which discharges the ash through the side ash chute. The ash plow consists of a metal bar which extends into the ash bed and diverts the ash flow to the side ash discharge chute.

The gasification operation first distills and carbonizes the wood or other biomass fuel and then gasifies the residual charcoal by partial combustion to obtain product gases that leave the upper part of chamber 20 by way of line 40. The composition of the mixture of gases which leaves the gasification chamber is dependent upon the gasification mixture which enters below the grate 26 and on the character of the fuel. For example, raw wood yields as distillation products, water of constitution, carbon dioxide, carbon monoxide, hydrogen, methane, acetic acid, methanol, and tarry matter. The distillation products vary individually with the type of wood or biomass fuel being gasified and to some extent with the rate at which the fuel is carbonized. It is not possible to be specific until a wood has been thoroughly tested. Charcoal and petroleum coke yield relatively small amounts of gaseous distillation products with no tar, methanol, or acetic acid. The distillation products mix with the gases formed by partial combustion of the "fixed" carbon of the fuel by reaction with oxygen and steam (and possibly carbon dioxide or sulfur dioxide), mixture.

The amount of oxygen supplied to the gasification chamber is an amount suitable to provide the desired partial combustion of the fuel. The ratios of oxygen, steam, nitrogen, carbon dioxide, and sulfur dioxide should be determined in actual operational conditions. The reactivity of the residual charcoal will influence the feed ratio. When making gas for the synthesis of methanol, nitrogen would be regarded as an undesirable diluent, so the gasification mixture may be substantially pure oxygen with an adequate amount of steam. It is expected that for wood gasification for the production of methanol, the steam-oxygen ratio may be in the range of about 2.6:1 to 5.5:1, for instance, about 3.6:1.

If ammonia synthesis gases are desired, then a source of nitrogen is needed, e.g., air, oxygen, and steam can be mixed and fed to the gasification operation. The steam plus nitrogen to oxygen ratio may be about 2.6:1 to 5.5:1 with the proportions being adjusted so that after treatment of the raw gas from the chamber, the proportions of hydrogen and nitrogen in the synthesis gas are suitable for ammonia production, e.g, about 3:1. To produce a low-Btu fuel gas, the gasification mixture would contain air and steam and the steam-air ratio may be about 0.1 to 0.5:1, preferably about 0.2:1. To produce a product containing sulfur, sulfur dioxide should be included in the gasification mixture.

As noted above, the composition of the feed gases may be varied according to the product gas desired.

The following example is presented for purposes of exemplification.

EXAMPLE

By way of example, the system depicted in FIG. 1 is used to provide a product gas which after purification and conditioning is used in the synthesis of methanol. Wood is withdrawn from a log stock-pile and cut into pieces 6 inches long and 4 inches to 8 inches in diameter, or up to b 12 inches semi-circular. The wood has an ash content of 0.8 weight %, 15.1 weight % fixed carbon, 54.1 weight % volatile matter, and 30 weight % moisture.

The wood is fed at a rate of 17 tons per hour to chamber 20 where it reacts with commercially pure oxygen and steam, mixed in the proportion of about 3 to 4 parts of steam per part of oxygen, preferably about $3\frac{1}{2}$ parts per part. This yields a crude synthesis gas with a dry gas analysis of 38.8 volume % $H_2$, 34.6 volume % CO, 21.9 volume % $CO_2$, 3.7 volume % $CH_4$, 0.8 volume % $N_2$ and 0.2 volume % $C_2$ along with some hydrocarbons, tars and oils, water-soluble hydrocarbons, water vapor and a slight amount of hydrogen sulfide. The small quantity of ash indigenous with the wood is removed from the recyle ash stream by screening and is discharged from the system for disposal.

The hot gas from the gasifiers is cooled and scrubbed with recirculating quench water, producing a cool gas at a rate of about 400,000 standard cubic feet per hour. Tar and oil is separated from the water and fed, together with oxygen, to a liquid partial oxidation gasifier to generate additional synthesis gas at a rate of about 90,000 standard cubic feet per hour. The water-soluble hydrocarbons are eliminated from the system on a small purge stream of the scrubbing water which is sent to waste water treating.

The clean raw gas is compressed to intermediate pressure, catalytically hydrogenated, heated, saturated with water, combined with gas from the tar partial oxidation unit, and then partially shifted in the high temperature shift unit to alter the required ratio of carbon oxides and hydrogen for synthesis of methanol. After passing through an acid gas removal unit for elimination of hydrogen sulfide and the required amount of carbon dioxide, the gas is combined with gas from the purge gas partial oxidation unit and is conducted to the methanol synthesis unit. Crude liquid methanol product from synthesis is conducted to a distillation unit for purification and then to product storage. Methanol is produced at about 120 to 130 tons per day.

Purge gas from the methanol synthesis unit is rich in methane. A portion of the purge gas is sent to a gas partial oxidation unit for production of additional synthesis gas, at a rate of about 80,000 cubic feet per hour, while the remainder of the purge gas is used as plant fuel for generating and superheating steam. Flash gas from the synthesis unit and off-gas from distillation also go to fuel; liquid purge from distillation is used as boiler fuel. The boiler also burns sawdust from the wood preparation area. Hydrogen sulfide ($H_2S$) from the acid gas removal unit is incinerated and discharged as sulfur dioxide ($SO_2$) from a tall stack. All waste water streams are treated to render them suitable for discharge. The purge stream of gasifier quench/scrubbing water is subjected to conventional biological treatment. All other waste water streams are conducted to conventional neutralization and settling facilities before discharge.

It is claimed:

1. A method of gasifying pieces of solid, low-ash biomass fuel in raw or partially carbonized form to provide gas relatively rich in carbon monoxide and hydrogen comprising charging said pieces of fuel together with a quantity of particulate, nonfusing refractory material into the upper portion of a gasification zone in which the lower portion comprises a partial combustion zone to form, on a supporting grate positioned below said partial combustion zone, a downwardly moving, compact bed of said refractory material and said pieces of fuel undergoing gasification; supplying an oxygen-containing, combustion-supporting gas to the lower portion of the bed to conduct said gasification and produce ash; said refractory material being charged in an amount sufficient to maintain on said grate a protective layer of said refractory material and ash produced by said combustion to provide a layer having an adequate depth or thickness to protect said grate from substantial deleterious effects due to said combustion; mechanically ashing said bed by moving said grate at a rate that maintains the downward movement of the pieces of fuel of the bed undergoing gasification and removes from said grate refractory charged to said bed and said formed ash at a rate sufficient to prevent their excessive accumulation on said gate; and removing from said bed product gases relatively rich in carbon monoxide and hydrogen.

2. The method of claim 1 where said pieces of fuel are fed to said combustion zone at a rate of about 25 to 40 pounds of fixed carbon per hour per square foot of cross-section of said bed measured at said grate.

3. The method of claim 1 or 2 wherein a mixture of steam and oxygen is supplied to said combustion zone in a volume ratio of steam to oxygen of about 2.6 to 5.5:1.

4. The method of claim 1 or 2 wherein gas supplied to said gasification zone contains steam, nitrogen and oxygen in proportions such that the product gas after treatment has a ratio of hydrogen:nitrogen suitable for ammonia synthesis.

5. The method of claim 1 or 2 wherein gas supplied to said gasification zone is a mixture of steam and air and gas suitable for use as a fuel gas is produced.

6. The method of claim 2 wherein said bed moves through a substantially greater cross-sectional area at an upper portion than at said grate.

7. The method of claim 6 wherein the lower portion of said bed is formed into a truncated, inverted cone.

8. The method of claim 1 wherein said bed moves through a substantially greater cross-sectional area at an upper portion than at said grate.

9. The method of claim 8 wherein the lower portion of said bed is formed into a truncated, inverted cone.

10. The method of claim 1 or 2 wherein said refractory material is ash produced by combustion of fuel.

11. The method of claim 1 or 2 wherein said refractory material has a substantial amount of particles sized in one only of the three ranges of about 1 to $1\frac{5}{8}$ inch, about $1\frac{5}{8}$ to $2\frac{1}{2}$ inch, and about $2\frac{1}{2}$ to 4 inch.

12. The method of claims 1, 2, 6, 7, or 9 wherein the weight or refractory fed to said gasification zone is about 4 to 8 tons per day per ash plow used for ash discharge.

13. The method of claim 3 wherein part of the steam is replaced by carbon dioxide, part of which is converted to carbon monoxide.

14. The method of claim 3 wherein part of the steam is replaced by sulfur dioxide to produce sulfur, and substantially pure sulfur is recovered.

* * * * *